United States Patent
Anderson et al.

(10) Patent No.: US 9,009,414 B2
(45) Date of Patent: Apr. 14, 2015

(54) PREFETCH ADDRESS HIT PREDICTION TO REDUCE MEMORY ACCESS LATENCY

(75) Inventors: Timothy D Anderson, Dallas, TX (US); Joseph R M Zbiciak, Arlington, TX (US); Matthew D Pierson, Murphy, TX (US)

(73) Assignee: Texas Instruments Incorporated, Dallas, TX (US)

(*) Notice: Subject to any disclaimer, the term of this patent is extended or adjusted under 35 U.S.C. 154(b) by 715 days.

(21) Appl. No.: 13/212,980

(22) Filed: Aug. 18, 2011

(65) Prior Publication Data

US 2012/0072672 A1 Mar. 22, 2012

Related U.S. Application Data

(60) Provisional application No. 61/387,367, filed on Sep. 28, 2010, provisional application No. 61/384,932, filed on Sep. 21, 2010.

(51) Int. Cl.
*G06F 12/00* (2006.01)
*G06F 12/08* (2006.01)
*G06F 9/38* (2006.01)

(52) U.S. Cl.
CPC ........ *G06F 12/0897* (2013.01); *G06F 12/0811* (2013.01); *G06F 12/0862* (2013.01); *G06F 12/0886* (2013.01); *G06F 2212/6022* (2013.01); *G06F 9/3802* (2013.01); *G06F 9/3806* (2013.01); *G06F 9/3844* (2013.01)

(58) Field of Classification Search
CPC .................. G06F 12/0862; G06F 12/0811
USPC .................................................... 711/137
See application file for complete search history.

(56) References Cited

U.S. PATENT DOCUMENTS

| | | | | |
|---|---|---|---|---|
| 5,680,564 | A * | 10/1997 | Divivier et al. | 712/205 |
| 5,958,040 | A * | 9/1999 | Jouppi | 712/207 |
| 2002/0144102 | A1* | 10/2002 | Svendsen et al. | 712/243 |
| 2009/0198950 | A1* | 8/2009 | Arimilli et al. | 711/205 |
| 2012/0030431 | A1* | 2/2012 | Anderson et al. | 711/137 |

* cited by examiner

*Primary Examiner* — Aimee Li
*Assistant Examiner* — Prasith Thammavong
(74) *Attorney, Agent, or Firm* — Robert D. Marshall, Jr.; Frank D. Cimino

(57) ABSTRACT

A prefetch unit receives a memory read request having an associated address for accessing data that is stored in memory. A next predicted address is determined in response to a prefetch address stored in a slot of an array for storing portions of predicted addresses and associated with a slot in accordance with an order in which a prefetch FIFO counter is modified to select the slots of the array. Data is prefetched from a lower-level hierarchical memory in accordance with a next predicted address and provisioned the prefetched data to minimize a read time for reading the prefetched data. The provisioned prefetched data is read-out when the address of the memory request is associated with the next predicted address.

20 Claims, 4 Drawing Sheets

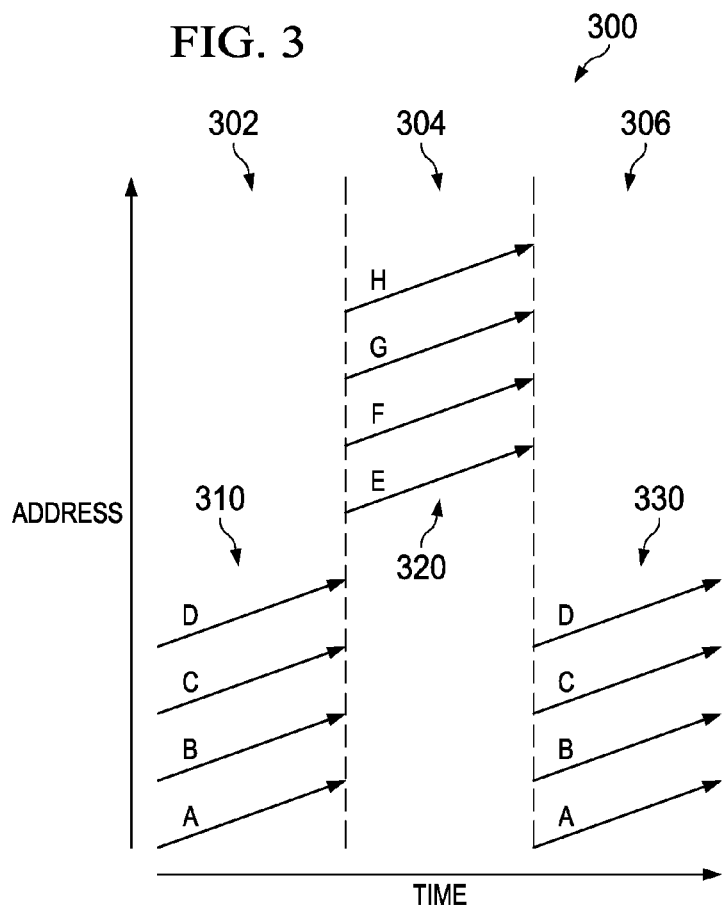
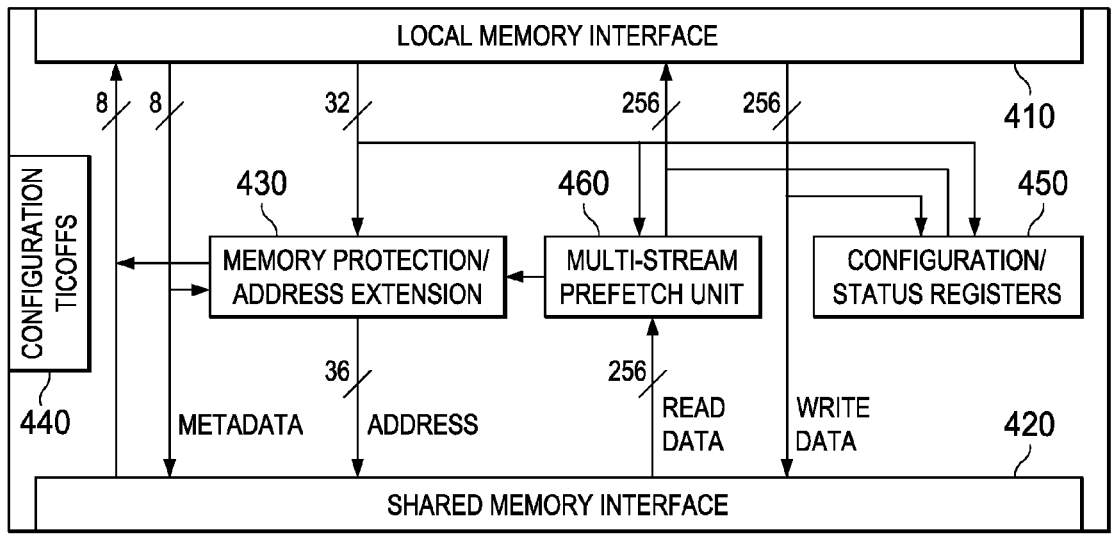

PREFETCH ADDRESS HIT PREDICTION TO REDUCE MEMORY ACCESS LATENCY

CLAIM OF PRIORITY

This application for Patent claims priority to U.S. Provisional Application No. 61/387,367 entitled "Combined integer to floating point conversions with varied precision formats" filed Sep. 28, 2010, and claims priority to U.S. Provisional Application No. 61/384,932 entitled "Prefetch Stream Filter with FIFO Allocation and Stream Direction Prediction" filed Sep. 21, 2010, wherein the applications listed above are incorporated by reference herein.

BACKGROUND

In computer architecture applications, processors often use caches and other memory local to the processor to access data during execution. The processors more efficiently execute instructions when, for example, data accessed by a processor is stored locally in a cache. Prefetchers are used to predictively access and store data in view of potential requests for the memory. A prefetcher stores blocks of memory locally in a smaller, lower latency memory. However, as prefetch buffers grow in size, the access latency (e.g., the time that is used to access the stored memory) also grows longer. As addressed in the instant disclosure, improved performance is possible by hiding the prefetch buffer latency (as well as the latency otherwise encountered when accessing main memory). Thus, an improvement in techniques for lowering latency requirements when referenced data is not stored or retained in a cache is desirable.

The problems noted above are solved in large part by a prefetch predictor that heuristically estimates which slot in a prefetch buffer is to be requested next (by a cache or processor, for example). As disclosed herein, a prefetch unit receives a memory read request having an associated address for accessing data that is stored in memory. A next predicted address is determined in response to a prefetch address stored in a slot of an array for storing portions of predicted addresses and associated with a slot in accordance with an order in which a prefetch FIFO counter is modified to select the slots of the array. Data is prefetched from a lower-level hierarchical memory in accordance with a next predicted address and the prefetched data is provisioned to minimize a read time for reading the prefetched data. The provisioned prefetched data is read-out when the address of the memory request is associated with the next predicted address.

Accordingly, the prefetch predictor heuristically estimates which slot in a prefetch buffer is to be requested next. The data contents of the slot that is estimated to be requested next are retrieved from the data prefetch buffer (which often requires one clock cycle) and placed in a predicted data buffer that is that is accessed more readily than the data prefetch buffer. When the estimation is correct, the contents of the predicted data buffer are output from the prefetcher, which thus avoids the latency required to retrieve the requested data from the data prefetch buffer.

BRIEF DESCRIPTION OF THE DRAWINGS

FIG. 3 is a timing diagram illustrating multi-stream memory accesses over time.

FIG. 4 is a block diagram illustrating a memory controller that includes a multi-stream prefetch unit in accordance with embodiments of the present disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
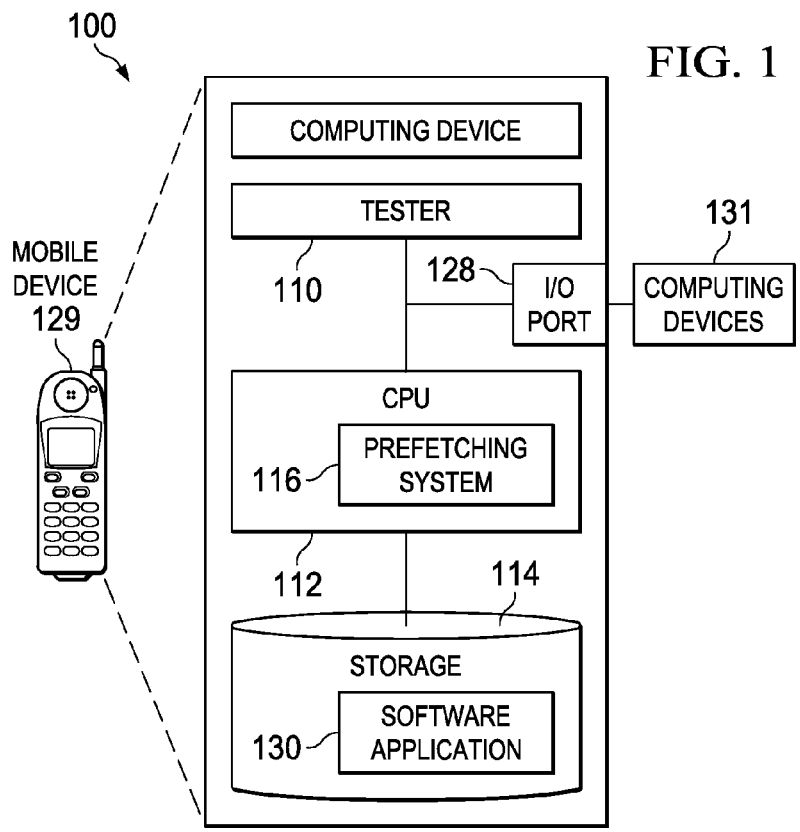
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 130. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or prefetching systems 116, which are used to perform memory prefetch operations during the execution of the software application 130.

Prefetching systems 116 track memory requests from multiple streams using "slots" to maintain pointers to memory addresses used to prefetch data for each stream. A prefetcher stores blocks of memory locally in a smaller, lower latency memory. However, as prefetch buffers grow in size, the access latency (e.g., the time that is used to access the stored memory) also grows longer.

Disclosed herein are techniques for reducing hardware latency associated with prefetch buffer memory accesses. The disclosed techniques reduce hardware latency by heuristically estimating which slot in a prefetch buffer is to be requested next (by a cache or processor, for example). The data associated with the estimated slot is preloaded into an output latch. The output latch is selected and the preloaded data is output when a memory request contains an address that is associated with the estimated slot. Thus, in an embodiment, a clock cycle for retrieving the data from a slot associated with a memory request in response to the memory request is avoided when the slot is successfully estimated and preloaded in the output latch.

Figure 2:
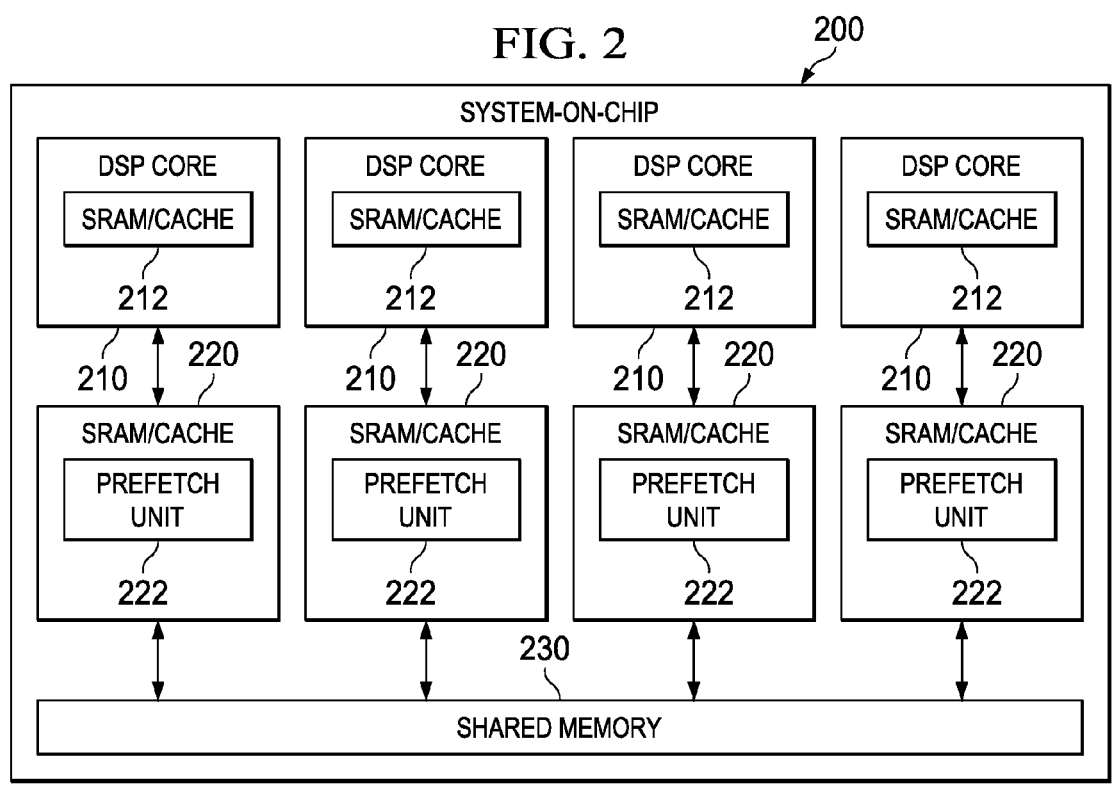
FIG. 2 is a block diagram illustrating a computing system including a prefetch unit in accordance with embodiments of the disclosure.

FIG. 2 is a block diagram illustrating a computing system including a prefetch unit in accordance with embodiments of the disclosure. Computing device 100 is illustrated as an SoC 200 that includes one or more DSP cores 210, SRAM/Caches 220, and shared memory 230. Although the illustrated elements of the computing system 200 are formed using a common substrate, the elements can also be implemented in separate substrates, circuit boards, and packages (including the shared memory 230).

Each DSP core 210 optionally includes a level-one data cache such as SRAM/Cache 212. Each DSP core 210 optionally is connected to a level-two cache such as SRAM/Cache 220. Each SRAM/Cache 220 optionally includes a prefetch unit 222 for prefetching data to provide relatively quick access to read and write memory. Additionally, each DSP core 210 is coupled to a shared memory 230, which usually provides slower (and typically less expensive) memory accesses than SRAM/Cache 212 or SRAM/Cache 220. The shared memory 230 stores program and data information that can be shared between each DSP core 210.

In various embodiments, the prefetch unit 222 is a multi-stream prefetcher that allocates an available slot to a present stream and reallocates the slot to a pending stream at a time when the present stream typically ceases to exist. In contrast, conventional solutions maintain a strict relationship between stream and slot number because the conventional allocate a certain slot to a given stream and maintain the relationship with the certain slot for reallocation when the data required by the stream is exhausted. Thus, the performance of conventional solutions is often hindered and can lead to prefetch unit stalls during prefetch generation.

FIG. 3 is a timing diagram illustrating multi-stream memory accesses over time. Plot 300 vertically represents increasing memory addresses and horizontally represents memory accesses over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for } (i=0; i<n; i++)\{a[i]+b[i]+c[i]=d[i]\} \quad [1]$$

performs memory accesses that, when plotted, produces traces (designated generally) 310. Each reference to an element of arrays "a," "b," "c," and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory such as SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, access type (data, instruction or prefetch), and request priority and elevated priority.

Memory controller 400 includes unit for memory protection/address extension 430. The unit for memory protection/address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a multi-stream prefetch unit 460. The multi-stream prefetch unit 460 is discussed below with respect to FIG. 5.

Figure 5:
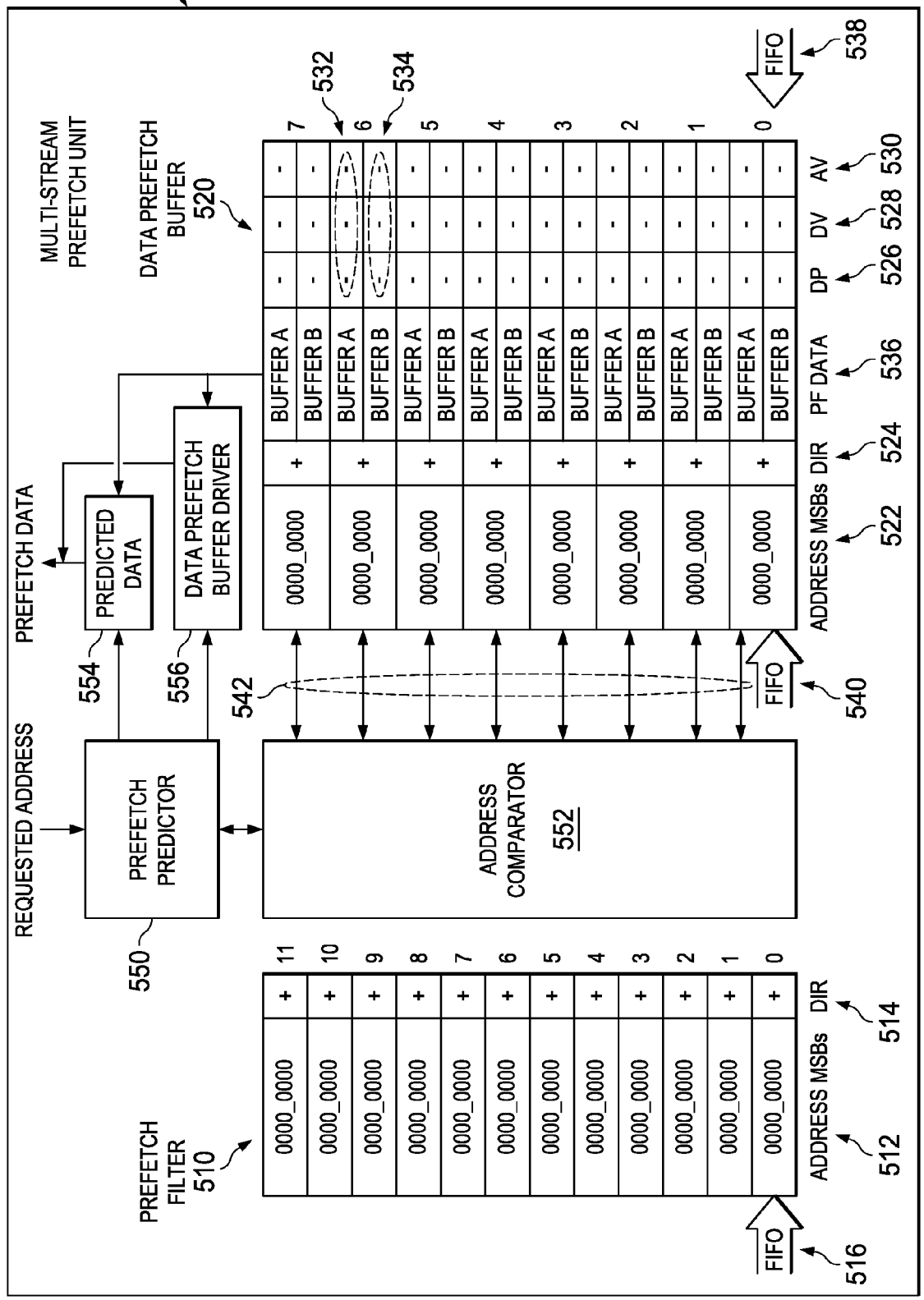
FIG. 5 is a block diagram illustrating a multi-stream prefetch unit in accordance with embodiments of the present disclosure.

FIG. 5 is a block diagram illustrating a multi-stream prefetch unit in accordance with embodiments of the present disclosure. Multi-stream prefetch unit 460 typically includes a prefetch filter 510 (which is used for identification of streams), a data prefetch buffer 520 (which is used to prefetch data for streams having assigned slots), and a prefetch predictor 550 (for predicting and controlling output buffers of the data prefetch buffer).

Identification of streams is a difficult problem as modern DSP (digital signal processor) code often contains data streams that progress in both incrementing (upward) and decrementing (downward) directions. Memory accesses also include many non-streaming accesses (which often have the appearance of random accesses as viewed in a memory access footprint plot, and are thus referred to as "random accesses" herein) that are not part of a predictable access pattern such as streams. Attempting to prefetch cache lines based on every memory request would result in a lot of unusable speculative traffic, which greatly amplifies memory bandwidth requirements and negatively impacts performance. The disclosed prefetch filter 510 works to filter out these random (non-streaming and/or non-prefetchable) accesses so that only predictable streams are used by the data prefetch buffer 520 to prefetch.

Prefetch filter 510 is also arranged to correctly predict direction as well as the location of streams. Stream detectors typically hold addresses for potentially identifying streams while waiting for a cache read to "hit" an address associated with one of the potential streams. Thus, address prediction, direction prediction, and replacement policies for the stream detector affect the performance of the multi-stream prefetch unit 460.

Prefetch filter 510 uses an aligned power-of-two address window, which is used to detect sequential accesses and to determine a direction of a stream. (As discussed below, the disclosed prefetch filter 510 in most cases only takes two sequential accesses to detect a stream, and otherwise, when the direction estimate is wrong, it only takes a third access to verify the direction of a stream to be identified.)

The direction estimate heuristic and FIFO-based allocation architecture minimizes power and area requirements due to their implementation efficiency while maintaining a high level of performance when executing DSP algorithms for emerging applications. Not requiring an adder to generate a sequential address for the address prediction function minimizes latency and thus improves the operating frequency of a filter implemented by a DSP that incorporates a multi-stream prefetch unit 460.

Prefetch filter 510 is a stream detection filter that includes a 12-address candidate buffer. Each slot of prefetch filter 510 stores one of up to 12 potential stream "head" (e.g., starting) addresses as logical addresses, along with a single bit (field 514) to indicate the predicted stream direction associated with that slot. Prefetch filter 510 uses a FIFO allocation order to assign a candidate stream to a slot, which is determined by a simple FIFO counter 516 (various counting systems, such as Gray code, can be used). Each new allocation of a candidate stream in the prefetch filter 510 uses the next slot number indicated by the FIFO counter 516. Allocation in the prefetch filter 510 proceeds, starting at slot #0, counting to slot #11, and then wrapping back to slot #0 when all 12 slots have been previously allocated.

Each candidate field 512 is initialized with zeros and is used to store a significant portion (e.g., most significant bits or portion) of an address of a memory access of a potential stream. Likewise, each direction field (DIR) 514 is initialized with a bit set to indicate a positive (or, alternatively, a negative) direction that is used to determine a successive prefetch address. A particular direction field 514 can be set by comparing the next memory request of a stream with the address of the stream head (or an incremented stream head).

For example, a demand request (a memory request that originates from the program processor) is received. An address of the demand request is compared with each of the candidate field 512 values, and if none match, the demand request is passed to shared (or main) memory, and the address of the demand request is modified (e.g., incremented or decremented in accordance with the direction field 514) and placed in the candidate field 512 that is pointed to by FIFO counter 516 (which in turn is incremented or wrapped around to zero at a terminal count). When a subsequent demand request is received and matches one of the candidate field 512 values (a "hit"), the value of the candidate field 512 (or a modified value thereof) is entered into the data prefetch buffer 520 (and the hit is "qualified" as discussed below), and the candidate field 512 is reset (e.g., erased or invalidated). If the subsequent demand request that is received matches one of the candidate fields 512 by a value modified (e.g., decremented or incremented) twice, the direction field is inverted and the value of the candidate field is transferred (as discussed below). In the event of a qualified hit, the direction field 514 value is transferred to the direction field 524 of the data prefetch buffer 520.

Thus, candidate field 512 entries in the prefetch filter 510 have the potential to become prefetch streams. The detection filter first determines whether memory accesses meet criteria such as whether the memory access is prefetchable, whether the memory access is a cache line fill for data, whether the memory access is an L1D (level-one data cache) access, whether the memory access is a non-critical half of an L2 line (level-two cache) line access, and whether the memory access is not already present in the data prefetch buffer 520.

The memory accesses meeting the preceding qualifications are then compared against the existing entries of potential streams in the various slots of the prefetch filter 510. L1D requests are compared at 64 byte granularity, whereas L2 requests are compared at 128 byte granularity. Whether a stream associated with a memory access is entered in to a slot is determined by whether the memory access matches an entry in the prefetch filter 510.

If the memory access does not match an existing entry (a "miss"), the prefetch filter 510 allocates a new filter slot and places the predicted next address and predicted stream direction in the newly allocated slot (selected by FIFO counter 516). The prefetch filter 510 does not always protect against redundant entries, which normally only occur when thrashing the cache, and are thus relatively rare occurrences. Table 1 illustrates the logic for how a direction of a stream is predicted on the basis of the origin of the memory access (request), the requested address, and the predicted address.

TABLE 1

| Requestor | Requested Address | Predicted Address | Predicted Direction |
| --- | --- | --- | --- |
| L1D | Bit 6 = 0 | Requested address + 64 | Increasing address |
| L1D | Bit 6 = 1 | Requested address − 64 | Decreasing address |
| L2 | Bit 7 = 0 | Requested address + 128 | Increasing address |
| L2 | Bit 7 = 1 | Requested address − 128 | Decreasing address |

If the memory access request does match an existing entry in a slot of the prefetch filter 510, the prefetch filter 510 allocates a new stream slot for the stream. The new stream slot is allocated by initializing its address to the next address in that stream according to the direction bit stored with that slot. After allocating the new stream slot, prefetches are initiated for the new stream slot. Thus, all new streams are initiated by having addresses that (over time) cross a 128 byte (L1D stream) or 256 byte (L2 stream) boundary. Thus, the first two fetches for each L1D stream (being half the size of L2 streams) normally correspond to the two half-slots of a single slot.

Multi-stream prefetch unit 460 includes the data prefetch buffer 520, which is used to prefetch data for streams having assigned slots. In an embodiment, the multi-stream prefetch unit 460 is a relatively simple prefetch engine for servicing direct L1P (level-one program) cache requests and L2 program fetches. The multi-stream prefetch unit 460 uses an extended memory prefetch scheme, extended to the full address space in shared memory. The multi-stream prefetch unit 460 handles cacheable, prefetchable data fetches as candidates for prefetching.

The multi-stream prefetch unit 460 holds eight logical slots, each of which is associated with storage for two 32-byte program fetches such as buffer A and B of PF (prefetch) data 536. Double buffering the data for each slot in PF data 536 allows for a prefetch to be started on a subsequent prefetch (for example) using buffer B before a memory request is made for the data in buffer A of the slot (e.g., a return-wait situation). The multi-stream prefetch unit 460 can reallocate a slot immediately if at least one of its two halves (e.g., buffer A or buffer B of PF data 536) is not busy and the slot is not in a hit-wait state (e.g., waiting for data associated with a multi-stream prefetch unit 460 hit to be read-out). The double-buffer approach allows new prefetch generation to proceed immediately in case a prefetch hit results in a return-wait situation (where, for example, for a prefetch to be started on a subsequent prefetch (for example) using buffer B before a memory request is made for the data in buffer A of the slot). Double buffering each slot of the multi-stream prefetch unit 460 speeds prefetching because the multi-stream prefetch unit 460 will normally need to reallocate the slot that the most recent demand fetch just hit, and the time of allocation when the local memory will read the data for the hit is not ascertainable beforehand. Thus the double-buffer approach allows the prefetch generation to proceed even before multi-stream prefetch unit 460 sends the hit data to the upstream local memory (e.g., SRAM/Cache 220).

Also, the data prefetch buffer 520 avoids reallocating a slot in the hit-wait state in case the prefetch associated with the slot is canceled. When the prefetch is canceled, the multi-stream prefetch unit 460 uses the address stored in the slot to regenerate the demand fetch. For example, a new prefetch too early by the multi-stream prefetch unit 460 may force the stream prefetch unit 460 (belonging to a neighboring slave, for example) to cancel the earlier prefetch.

Each of the eight slots has at least one address field 522, a direction field (DIR) 524, a data pending (DP) field 526, a data valid (DV) field 528, an address valid (AV) field 530, and a predicted next prefetch half-slot (PHP) field 536. Address field 522 stores upper bits of a logical address associated with the associated slot. The logical address is generated by a data prefetch address generator 558 that is arranged to generate data prefetch addresses in response to received addresses that are associated with memory requests. Data pending (DP) field 526 is used to indicate whether a prefetch is outstanding in the associated slot. Data valid (DV) field 528 is used to indicate whether the program data in the associated slot is valid. The data prefetch unit 464 does not necessarily keep a separate "address valid" bit for each stream. Instead, the data prefetch unit 464 launches prefetch requests for any slot that has data pending or data valid bit that is set to be valid. Thus, a demand fetch would normally only "hit" slots for which DP is pending or DV is valid.

A data pending (DP) field 526, a data valid (DV) field 528, and an address valid (AV) field 530 is used for each half-slot. Thus (for example), group 532 includes a data pending (DP) field 526, a data valid (DV) field 528, and an address valid (AV) field 530 for a first half slot of a slot, and group 534 includes a data pending (DP) field 526, a data valid (DV) field 528, an address valid (AV) field 530 for a second half-slot of the slot.

The multi-stream prefetch unit 460 allocates slots using a FIFO allocation ordering system (such described above with respect to the prefetch filter 510). For example, slot #0 is allocated first (by using FIFO counter 540 to point to slot #0), followed by slot #1, #2 and #3, and so on until the last slot (such as slot #7) before wrapping back to slot #0. Each slot is associated with two 32-byte data buffers that are structured respectively as a first and second portion of a double-buffer.

In the case of a typical prefetch hit (determined by prefetch address comparators 552, for example) that occurs in response to a memory request, the multi-stream prefetch unit 460 queues the prefetch data for return. If the multi-stream prefetch unit 460 queues has no other return data queued, the multi-stream prefetch unit 460 can begin returning data in response to the memory request.

In the event where the prefetch predictor 550 has not successfully predicted the memory request in the event of a hit in the data prefetch buffer 520, the data can be retrieved from data prefetch buffer in two clock cycles. During the first clock cycle prefetch address comparators 552 drives an enable line (e.g., in bus 542) to select a slot that is associated with the address of the memory request and to set-up a selected portion (e.g., upper-half and/or lower-half) of the slot for a memory read. During the second clock cycle, data is read from buffer A and/or B of prefetch (PF) data 536 for the selected slot. Data prefetch buffer driver 556 is enabled to drive a data portion of a bus so that the requested data can be retrieved in response to the memory request.

Thus, the prefetch buffer would ordinarily take two full clock cycles to reply to a prefetch hit: to potentially reduce the latency of two clock cycles, the prefetch predictor 550 anticipates which slot or half-slot would likely be hit next and provisions the data for readout in one clock cycle. In an embodiment, the prefetch predictor 550 asserts the anticipated read-out address ahead of time (e.g., before a next memory request is received) to minimize (for example) the time required to retrieve the data from the associated half-slot. In another embodiment the data from the anticipated half-slot is copied to predicted data buffer 554 (which has a select signal asserted in response to the address anticipated by the prefetch predictor 550) to provision (e.g. set-up) the predicted data buffer 554 to be read before a memory request is received that has an address associated with the slot from which the data from the predicted data buffer 554 was obtained. Thus, when a new memory request arrives that matches the previously asserted address, the prefetch buffer can respond with data in the following clock cycle, and thus respond within a zero wait-state response time.

The prefetch predictor 550 heuristically determines the predicted next prefetch (PNP) by anticipating that the next prefetch hit will be for the slot "after" the slot for the current hit in the prefetch buffer. The slot "after" the currently hit slot is the next slot that follows the currently hit slot in accordance with the direction of the stream that is associated with the currently hit slot. The probabilities for correctly predicting the next prefetch are increased (over random estimates, for example) because (as disclosed herein) prefetch slots are allocated in a FIFO allocation order, and thus prefetch hits are more likely to occur in the order used for FIFO allocation (e.g., the FIFO allocation order). The prefetch predictor 550 uses FIFO counter 538 to point to the predicted next prefetch.

In addition to selecting a slot, an upper-half or lower-half of the slot is predicted. The prefetch predictor 550 determines an upper- or lower-half for the predicted next prefetch by selecting the lower-half of the (next) slot when the stream associated with that slot is moving in the increasing-address direction, and or the upper-half otherwise. In the case where L2 (cache level two) line fills are accomplished by reading half-slots (such as occurs when prefetching data), L2 line fills are optimized (e.g., with zero wait state response) when the requested half-line from L2 correlates properly with the direction of the stream associated with the predicted half-slot.

Because of bus width limitations, the length of the memory lines associated with slots are often wider than the bus width used to retrieve data for filling the lines. Thus memory lines are typically requested (for example) on a half-line or sub-line basis where the data to be cached is sent from a lower-level memory to the higher-level cache as a series of data bursts to retrieve the entire line. The data for storing in the allocated cache line are sent such that the requested portion (e.g., the data that is addressed by the demand memory request) of the line returns first (the "critical" sub-line), which is then followed by the subsequent ("non-critical") sub-lines. A CPU (for example) that generated the demand request then "unstalls" and resumes execution when the critical sub-line is fetched from the cache.

Another embodiment of the prefetch predictor 550 can be used to handle program prefetching. When a memory request for program instructions misses the prefetch buffer, the prefetch predictor 550 sets the predicted next prefetch slot to the first allocated slot. When a prefetch hit of a critical sub-line occurs due to an L2 request for program prefetching, no action is taken because no new prefetches typically result. When a prefetch hit of a non-critical sub-line occurs due to an L2 request (which typically triggers new prefetches), the predicted next prefetch slot is set to the first allocated slot. When a prefetch hit occurs due to an L1P (level-one program) request, the predicted next prefetch slot is set to one slot after (e.g., in the order determined by the stream associated with the hit slot) the slot just hit in accordance with the FIFO slot allocation order. The prefetch predictor 550 determines the criticality of the sub-line being fetched and the origin of the memory request by evaluating the metadata signals discussed above with respect to FIG. 4.

Figure 6:
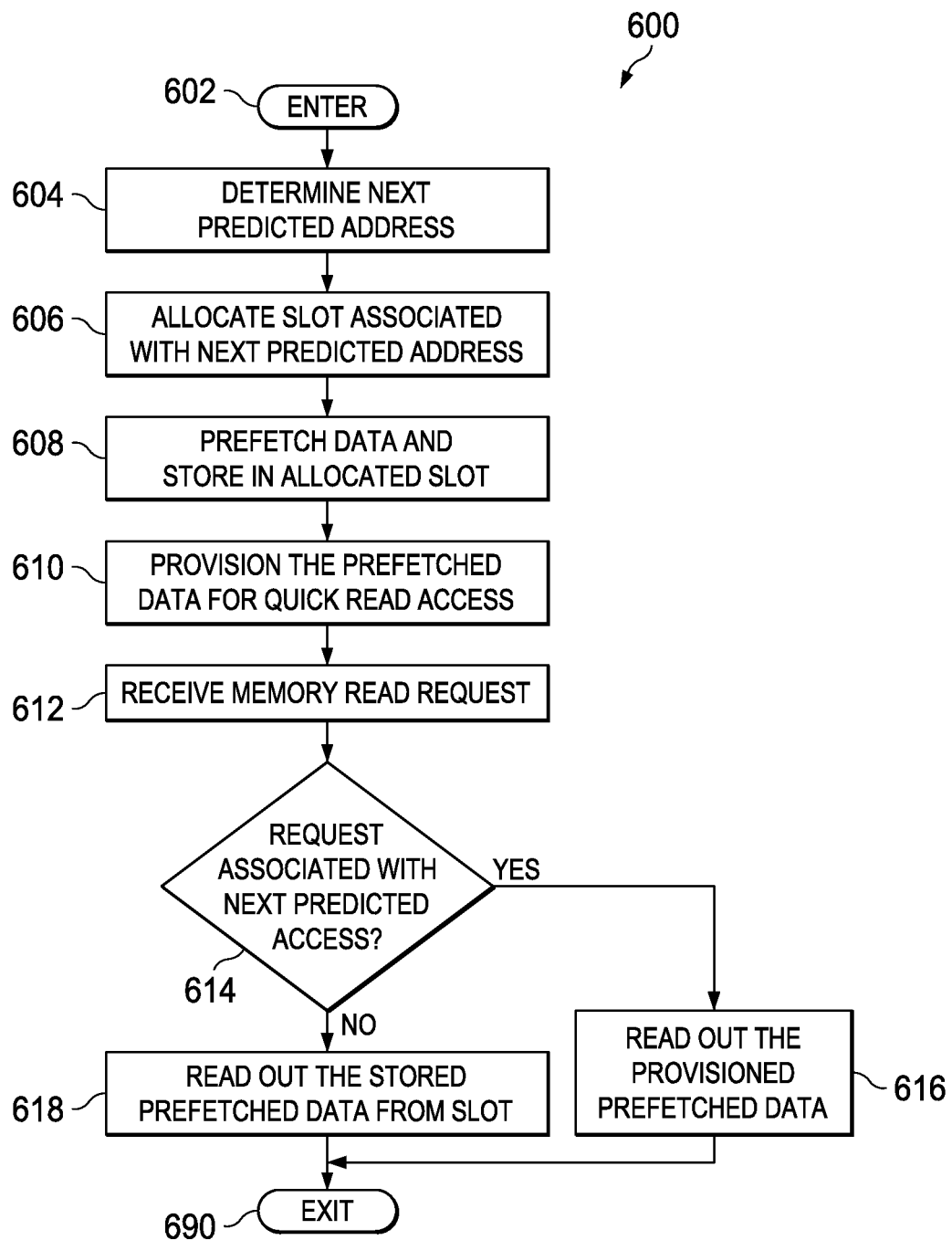
FIG. 6 is a process diagram illustrating prefetch address hit prediction process in accordance with embodiments of the present disclosure.

FIG. 6 is a process diagram illustrating prefetch address hit prediction process in accordance with embodiments of the present disclosure. Process 600 is entered at node 602 and proceeds to function 604. At function 604, a predicted next prefetch address is predicted in response to a prefetch address stored in a slot of an array for storing portions of predicted addresses. The next predicted address is determined in response to the predicted address and a memory stream direction of the associated memory slot that is determined by determining a direction of a memory stream associated with a slot of an array for storing portions of predicted addresses.

At function 606, a slot associated with the next predicted address in accordance with an order in which a prefetch FIFO counter is modified to cycle through the slots of the array before wrapping around to a first slot of the array for storing portions of predicted addresses. For data prefetches, the prefetch predictor anticipates that the next prefetch hit will be for the address associated with the next slot after the slot for which the current hit in the prefetch buffer was made. In the event of a previous hit on a half-slot, the prefetch predictor selects the lower-address half of the slot if the stream associated with that slot is moving in the increasing-address direction, and selects the upper-address half when the stream associated with that slot is moving in the decreasing-address direction.

When the prefetch predictor is handling program prefetches, the prefetch predictor determines when a prefetch hit of a non-critical sub-line occurs due to an L2 request (which typically triggers new prefetches) and allocates the first slot for the predicted next prefetch slot. When a prefetch hit occurs due to an L1P (level-one program) request, the predicted next prefetch slot is set to one slot after (e.g., in the order determined by the stream associated with the hit slot) the slot just hit in accordance with the FIFO slot allocation order.

In function 608, the data associated with the predicted next prefetch is prefetched from a lower-level hierarchical memory in accordance with a next predicted address and stored in the allocated slot associated with the next predicted address.

In function 610, the prefetched data from the allocated slot is provisioned to minimize a read time for reading the stored prefetched data. In an embodiment, the prefetched data prefetched from the next predicted address is provisioned by asserting read set-up control signals coupled to the allocated slot of the array in which the prefetched data prefetched from the next predicted address is stored. In another embodiment, the prefetched data prefetched from the next predicted address is provisioned by storing the prefetched data prefetched from the next predicted address in a data buffer that has a select signal that is asserted in response to the address of the received memory request being anticipated by the prefetch predictor. For example, the data buffer is a high-speed buffer having a read-out time that is less than the time required to read-out the data stored in a slot when the slot is enabled for read-out in response to a hit from a received memory request.

In function 612, a memory read request is received that contains an address for retrieving from memory. The prefetch predictor determines whether an address that is associated with the received memory request is the address that has currently predicted by the prefetch predictor. Likewise, the data prefetch buffer determines whether the address that is associated with the received memory request is present (or "hit") in a slot of an array for storing an indication of the address of a prior cache request.

In function 614, if the address that is associated with the received memory request is the address that has currently predicted by the prefetch predictor, the process flow continues to function 616, or if not, the process flow continues to function 618.

In function 616, the provisioned prefetched data is read-out when the address of the memory request is associated with (e.g., matches or hits) the next predicted address. After the provisioned prefetched data is read-out, the process flow continues to node 690, where the process flow exits.

In function 618, the stored prefetched data stored in a slot that is not associated with the next predicted address is read-out when the address of the memory request is not associated with (e.g., does not hit or match) the next predicted address.

After the provisioned prefetched data is read-out from its slot, the process flow continues to node 690, where the process flow exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for provisioning data for anticipated memory prefetches in caching systems, comprising:
    determining a next predicted address in response to a prefetch address stored in a prefetch filter slot of an array for storing portions of predicted addresses;
    allocating a prefetch filter slot associated with the next predicted address in accordance with an order in which a prefetch FIFO counter is modified to cycle through the prefetch filter slots of the array before wrapping around to a first prefetch filter slot of the array for storing portions of predicted addresses;
    prefetching data from a lower-level hierarchical memory in accordance with a next predicted address and storing the prefetched data in an allocated data prefetch buffer slot associated with the next predicted address;
    provisioning the prefetched data stored in the data prefetch buffer slot associated with the next predicted address to minimize a read time for reading the prefetched data stored at the next predicted address;
    receiving a memory request having an address for reading data stored in memory;
    determining if the address of the received memory request is associated with the next predicted address;
    reading the provisioned prefetched data when the address of the memory request is associated with the next predicted address; and
    reading stored prefetched data stored in a data prefetch buffer slot different than the data prefetch buffer slot associated with the next predicted address when the address of the memory request is not associated with the next predicted address.

2. The method of claim 1, wherein:
    said step of determining the next predicted address employs the prefetch address and a memory stream direction associated with a prefetch filter slot of an array for storing portions of predicted addresses.

3. The method of claim 1, wherein the allocated prefetch filter slot associated with the next predicted address is next to the prefetch filter slot associated with the prefetch address used to determine the next predicted address.

4. The method of claim 1, wherein the memory request is received after the process for provisioning the prefetched data has been initiated.

5. The method of claim 1, wherein:
    said step of provisioning the prefetched data at the next predicted address includes asserting read set-up control signals coupled to the allocated data prefetch buffer slot storing the prefetched data at the next predicted address.

6. The method of claim 1, wherein:
    said step of provisioning the prefetched data at the next predicted address includes storing the prefetched data at the next predicted address in a data buffer separate from the data prefetch buffer slots having a select signal asserted in response to the address of the received memory request being associated with the next predicted address.

7. The method of claim 1, wherein the memory request is a request from a level-two cache to read data stored in a lower-level memory.

8. The method of claim 1, the memory request is a request from a level-one program cache to read program data stored in a lower-level memory.

9. The method of claim 1, wherein:
    said step of determining the next predicted address employs the prefetch address and a memory stream direction of the associated prefetch filter slot that is determined by a prefetch filter that is arranged to determine memory streams and a memory stream direction for each determined memory stream.

10. The method of claim 1, wherein:
    said step of reading stored prefetched data stored in a data prefetch buffer slot that is not associated with the next predicted address requires at least one more clock cycle than reading the provisioned prefetched data.

11. The method of claim 1, wherein:
    said step of determining a next predicted address selects a lower-address half of the data prefetch buffer slot associated with the next predicted address when the associated stream of the slot associated with the next predicted address is moving in an increasing-address direction, and selects an upper-address half of the data prefetch buffer slot associated with the next predicted address when the associated stream associated with the slot associated with the next predicted address is moving in a decreasing-address direction.

12. The method of claim 1, wherein:
    said step of determining the next predicted address employs the predicted address, a memory stream direction of the associated prefetch filter slot that is determined by determining a direction of a memory stream associated with a prefetch filter slot of an array for storing portions of predicted addresses, and a determination that a previously received memory request has not generated a sub-line fill that contains the data requested by the previously received memory request.

13. A digital system, comprising:
    a memory including local memory and a lower-level hierarchical memory for storing and retrieving data;
    a prefetch unit that includes a memory interface that is arranged to receive a memory read request having an associated address that points to data stored in the lower-level hierarchical memory, wherein the prefetch unit is arranged to determine a next predicted address in response to a prefetch address stored in a prefetch filter slot of an array for storing portions of predicted addresses and is associated with a prefetch filter slot in accordance with an order in which a prefetch FIFO counter is modified to select the slots of the array, to prefetch data from the lower-level hierarchical memory in accordance with the next predicted address and store the prefetched data in a data prefetch buffer slot associated with the next predicted address, to provision the prefetched data to minimize a read time for reading the prefetched data stored at the next predicted address, and to read-out the provisioned prefetched data when the address of the memory request is associated with the next predicted address.

14. The system of claim 13, wherein the prefetch unit is arranged to determine the next predicted address in response to the prefetch address and a memory stream direction of the associated memory slot associated with a slot of an array for storing portions of predicted addresses.

15. The system of claim 13, wherein the prefetch filter slot associated with the next predicted address is next to the prefetch filter slot associated with the prefetch address used to determine the next predicted address.

16. The system of claim 13, wherein the prefetch unit is arranged to provision prefetched data prefetched from the next predicted address by asserting read set-up control signals coupled to the allocated slot of the array in which the prefetched data prefetched from the next predicted address is stored.

17. The system of claim 13, wherein the prefetch unit is arranged to provision prefetched data prefetched from the next predicted address by storing the prefetched data prefetched from the next predicted address in a data buffer separate from the data prefetch buffer slots that has a select signal that is asserted in response to the address of the received memory request being anticipated by the prefetch predictor.

18. A prefetch unit for provisioning data for anticipated memory prefetches in caching systems, comprising:
   a memory interface that is arranged to receive memory read requests each having an associated address, wherein the associated address points to data stored in a lower-level hierarchical memory;
   an array that includes prefetch filter slots for storing a portion of a predicted address and data prefetch buffer slots storing the prefetched data associated with the predicted address;
   a prefetch FIFO (First In-First Out) counter having a counting system that is arranged to cycle through the prefetch filter slots of the array to allocate each next prefetch filter slot for storing subsequent indications of the address of subsequent cache requests in turn before wrapping around to a first slot of the filter array;
   a prefetch predictor that is arranged to determine a next predicted address in response to a prefetch address stored in a prefetch filter slot of an array and to provision data prefetched in response to the next predicted address and stored in data prefetch buffer slots of the array to minimize a read time for reading the prefetched data stored at the next predicted address; and
   a comparator comparing a subsequent memory read request that contains an address with an address associated with the provisioned data prefetched in response to the next predicted address, the comparator arranged to enable the read-out the provisioned data in response to the subsequent memory read request address being associated with the next predicted address.

19. The prefetch unit of claim 18, wherein the prefetch unit is arranged to determine the next predicted address in response to the prefetch address and a memory stream direction of the slot that is pointed to by a current setting of the prefetch FIFO counter, and to store the next predicted address in a prefetch filter slot that is pointed to by the next setting of the FIFO counter according to the counting system of the prefetch FIFO counter.

20. The prefetch unit of claim 19, wherein the prefetch predictor is arranged to provision data prefetched in response to the next predicted address and stored in the array by asserting read set-up control signals coupled to the slot of the array in which the prefetched data prefetched from the next predicted address is stored.

* * * * *